3,455,731
Patented July 15, 1969

3,455,731
HEAT-RESISTANT COATINGS
Morris L. Nielsen, Dayton, Clayton E. Hathaway, Jr., Kettering, and John Mann Butler, Dayton, Ohio, assignors to Monsanto Research Corporation, St. Louis, Mo., a corporation of Delaware
No Drawing. Filed Feb. 25, 1966, Ser. No. 529,955
Int. Cl. C23c 1/02; C09d 5/00
U.S. Cl. 117—127                        14 Claims

ABSTRACT OF THE DISCLOSURE

Process for preparing a heat-resistant coating in which a substrate is coated with a composition containing (1) a zinc salt of an alkyl phosphonic, phosphinic, phosphoric, phosphoramidic or phosphorodiamidic acid, (2) a zinc compound (oxide, salt or alcoholate), (3) titanium dioxide and (4) a diluent, and thereafter curing at 130°–550° C. Cured compositions useful per se or in composites.

This invention relates to heat-resistant coatings and more particularly provides a new and valuable method for the preparation of such coatings.

It is well known that modern aircraft and space vehicles attain velocities at which friction with the atmosphere generates a tremendous amount of heat. The surface temperatures of such craft approach and occasionally even exceed that at which the metal surfaces oxidize and deteriorate. Exen such metals as stainless steel, titanium or molybdenum will, at sufficiently high temperatures, be oxidized and thereby weakened so as to lose their mechanical strength. Various expedients have been used to protect the metal against oxidation, the most successful being coatings of ceramic materials. These are exemplified by porcelain enamel coatings. Such coatings are usually applied as a finely ground frit and fired at a sufficiently high temperature to soften the coating and to cause it to fuse together, at say, 800° to 1500° F. It is obvious that if the coating were reheated to a temperature within this range, say to 1000° F., the coating would again soften. Therefore, for a given enamel coating, the service temperature at which it is a useful solid coating will usually be lower than the firing temperature at which it is formed.

An object of this invention is to provide a heat-resistant composition which, when formed on surfaces as a film of substantial thickness, adheres tenaciously to the substrate and withstands elevated temperatures. Another object is the provision of heat-resistant protective coatings for metals, presenting a tough, hard surface of pleasing appearance. Still another object is the provision of heat-resistant coatings by application of a fluid coating composition which dries and leaves an adherent deposit on a substrate at comparatively low temperatures, and which can thereafter be converted to a hard, tenacious, heat-resistant coating by further heating. Still another object is to provide a heat-resistant composition which serves as a bonding agent.

These and other objects hereinafter defined are met by the invention wherein there is provided a heat-resistant coating prepared by: (a) applying to the surface of a substrate a substantially uniform layer of a fluid composition comprising a mixture of (1) a zinc salt of a phosphorus compound having a formula selected from the class consisting of

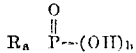

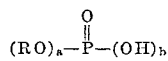

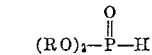

and

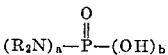

in which R is alkyl containing from 1 to 18 carbon atoms, $a$ and $b$ are integers of from 1 to 2, and $a+b=3$, (2) a zinc compound selected from the class consisting of the oxide, the salts of inorganic and organic acids, and the alcoholates of zinc in quantity to provide a total zinc-to-phosphorus atomic ratio in the mixture of between 0.5:1.0 and 2.0:1.0, (3) finely comminuted titanium dioxide in quantity to provide a titanium-to-phosphorus atomic ratio in the mixture of between 0.5:1.0 and 21.0:1.0, and (4) an inert, organic, volatilizable liquid diluent; (b) volatilizing said diluent from said fluid composition to leave a residue on said surface; and (c) heating said residue at a temperature of between 130° C. and 550° C. until the components which decompose at this temperature have decomposed to obtain upon the substrate a strongly adherent in situ formed heat-resistant coating. By heat-resistant coatings are meant coatings which do not soften appreciably at temperatures up to 538° C. (1000° F.).

The presently useful zinc salts of phosphorus compounds are generally solid, well-defined compounds which are well known in the art. They may be readily prepared, e.g., by the reaction of zinc carbonate with a dialkyl phosphoric acid (V. A. Mikhailov and E. F. Grigoreva, Chem. Abs. 61, 272d). Alternatively, the reaction of zinc oxide with a dialkyl phosphonate may be employed as disclosed by R. W. Liggett et al. in I. and E. C. Product Research and Development, 4, 145 (1965). For example, the reaction of zinc acetate with an acidic phosphorus compound may be employed. The reaction of zinc acetate with dimethylphosphinic acid has been described by S. H. Rose and B. P. Block in J. Polymer Sci. (in press).

The phosphorus compounds useful for preparing the zinc salts include those having R—P, R—O—P, and R—N—P structures wherein R is alkyl, and having either —OH or —H attached to phosphorus, e.g., methylphosphonic acid, ethylphosphonic acid, dimethylphosphinic acid, diethylphosphinic acid, dibutylphosphinic acid, ethyl phosphoric acid, butyl phosphoric acid, octyl phosphoric acid, dimethyl phosphoric acid, diethyl phosphoric acid, dibutyl phosphoric acid, dioctyl phosphoric acid, dilauryl phosphoric acid, diethyl phosphonate, dioctyl phosphonate, dimethylphosphoramidic acid, diamylphosphoramidic acid, tetramethylphosphorodiamidic acid and tetrapropylphosphorodiamidic acid.

The common characteristic of the present zinc salts of phosphorus compounds is that they are decomposed by heat, either in an inert atmosphere or in air, with appreciable loss of the organic moiety. Thus, zinc diethyl phosphate loses about 44% of its weight when heated to 538° C.

The phosphorus compounds need not be highly purified but may be mixtures. For example, the mono- and dialkyl phosphoric acids obtained in mixed form by the reaction of alcohols with phosphorus pentoxide are useful within the present invention.

It will be apparent that the presently useful fluid compositions may be prepared by using either previously isolated zinc salts of the phosphorus compounds or by making the zinc salts during the mixing or preparation of said composition. Thus, the phosphorus compound and the calculated amount of zinc oxide or zinc carbonate to form the zinc salt may be mixed together with the additional zinc compound to adjust the zinc-to-phosphorus ratio, and with the finely comminuted titanium dioxide, and the organic diluent, preferably by ball-milling, until a smooth suspension is obtained, suitable for application.

According to the invention, it has been found that when a solution or dispersion of the zinc salt is mixed with a significant quantity of titanium dioxide, to give a titanium-to-phosphorus atomic ratio in the mixture of between 0.5:1.0 and 21.0:1.0, and said mixture is applied to a substrate and dried to leave a film or deposit, there is left, upon heating said film or deposit at a temperature of from 130° to 550° C., an adherent coating. During the heating step the weight and thickness of the coating gradually decrease owing to change in the zinc salt. The weight loss generally falls within the range of from 5% to 40% depending upon the organic content of the composition and upon the temperature and duration of heating. When the alkyl group R is methyl, the percent loss in total weight will obviously by less than when R is lauryl. For rapid removal of the organic content, the higher heating temperatures may be employed, e.g., from 300° to 550° C. Where such temperatures are not conveniently attainable, or where they are undesirable because of heat-sensitive substrates, or where unusually thick layers of the coatings are to be cured, the lower temperatures of from 130° to 300° C. are useful. It may then be necessary to extend the heating time until a satisfactory coating has been obtained. This balance between time and temperature is readily ascertained by routine experimentation. It has been found generally desirable to remove substantially all of the organic matter by heating until there is formed a cured, thermally stable coating. Little, if any, weight loss is noticed when the completely cured compositions are reheated. Accordingly, in the case of the zinc salt-titanium dioxide coatings, there is obtained, during the heating step, an in situ formed coating of high thermal stability.

Although the make-up and nature of the cured coatings are uncertain it appears that the coatings are not merely mixtures of known zinc phosphates and titanium dioxide. As shown in the examples below, in several instances X-ray diffraction has detected low concentrations of crystalline zinc orthophosphate, $\alpha$-$Zn_3(PO_4)_2$, in coatings obtained from applied compositions having a zinc-to-phosphorus ratio of 1:1; it is noted that $Zn_3(PO_4)_2$ has a zinc-to-phosphorus ratio of 3:2. However, for a complete material balance, one must assume the presence of other non-crystalline, glassy or amorphous products which might occur in the Zn-P-Ti-O system.

The fluid composition of the present invention may intained from applied compositions having a zinc-to-phosphorus compounds and the titanium dioxide, a sufficient amount of another zinc compound to achieve a total zinc-to-phosphorus atomic ratio of between 0.5:1.0 and 2.0:1.0. For this purpose, zinc oxide may be used, or a decomposable zinc compound, e.g., zinc nitrate, zinc formate, zinc acetate, zinc oxalate, zinc octoate, etc. Under heating conditions, the zinc compound interacts with the residue formed by the decomposition of the zinc salts of the phosphoric compounds and the titanium dioxide.

These fluid compositions contain an inert, organic, volatilizable liquid diluent which preferably serves as a solvent for the zinc salt of the phosphorus compound and as a vehicle for the composition. For such purpose a relatively low-boiling inert oragnic diluent or solvent has proved useful, e.g., heptane, toluene, xylene, dimethyl acetamide, 1-methyl-2-pyrrolidinone, etc. Certain of the zinc salts of the phosphorus compounds, especially those having a zinc-to-phosphorus ratio of 0.5:1.0, are soluble in non-polar solvents such as xylene, forming viscous solutions. Such combinations are therefore advantageous in that they form well-bodied paints of suitable viscosity. Where it is desirable to reduce the viscosity of the combinations, as when high concentrations of the zinc salts are desired, polar solvents such as water or alcohols, e.g., n-butanol, may be employed either wholly or partially as replacement for the non-polar solvents.

Drying of the fluid composition upon the substrate may be done with or without heating, depending upon the ease of volatilization of the solvent. Air-drying at room temperature may be employed, particularly when evaporation of the solvent requires little, if any, application of heat.

The heating step may be conducted either in an inert atmosphere which may be, e.g., nitrogen, argon, carbon dioxide, or vacuum, or in air. Advantageously the substrate, with the dried coating deposited thereon, is subjected, during a period of, say, from about one to six hours, to gradually increasing temperatures until a maximum of about 130° C. to 550° C. has been attained and heating is continued at the maximum temperature for a time of from about a few minutes to an hour in order to assure completion of curing.

The presently useful coatings are practically white in appearance, firmly adherent to the solid substrate, and relatively non-porous and free from defects. Accordingly, the present coating method and the coated substrate provided thereby are eminently suited for space applications wherein long exposure to high temperatures in an inert atmosphere is encountered. The essentially inorganic, tightly bonded coating is tough and smooth and remains so in spite of such exposure. The white coating, when applied to the surface of a metal object, is an admirable reflector of light and heat, and is useful for thermal control. Because of the integrity of the coating it is useful for protection of oxidizable substrates against oxidation, as, for example, ferrous alloys, copper, graphite, etc. The coating affords corrosion resistance, and is useful in protecting ferrous alloys against salt spray. Because of its high softening point and amorphous nature, the coating is useful as a lubricant in the cold-forming and extrusion of metals. The unique bonding properties of these coatings make them particularly useful as cementing agents for powders, e.g., metals graphite, sand, clay, etc. They are also useful as adhesives for solid substrates in sheet form, such as metal strips or sheets.

The heat-resistant composition need not be applied as a liquid, fluid composition. Thus, a powdered mixture comprising the zinc salt of a phosphorus compound defined above, the zinc compound, e.g., zinc oxide, etc., and the finely comminuted titanium dioxide may be molded and baked to form a dense, hard object having fine detail. The powdered mixture may also be used for providing a coating on a substrate by the fluidized bed process. The heat-resistant composition may also be used as a bonding agent for solid materials, e.g., powders, fibers, fabrics, metal surfaces, ceramic objects, etc.; the dry powdered mixture may be added to the powders, fibers, etc. and the whole heated to a temperature between 130° C. and 538° C., or generally between 200° C. and 350° C., preferably with application of pressure. The resulting composites are dense, hard, and well-bonded.

The invention is further illustrated by, but not limted to, the following examples.

Example 1

This example shows the preparation of a coating in which the zinc-to-phosphorus atomic ratio is 0.5:1.

There was first prepared zinc diethyl phosphate. To 0.2 mole of diethyl phosphoric acid in about 75 ml. of water was added 8.1 g. (0.1 mole) of zinc oxide with stirring. After 1 hour further stirring, a small amount of insoluble matter was filtered off and the solution concentrated under vacuum to yield crystals, M.P. 175–180° C. The X-ray diffraction pattern was distinctive. The material was soluble in water, hot n-butanol or hot benzene. It analyzed as follows:

*Analysis.*—Calcd. for $C_{20}H_{20}O_8P_2Zn$: C, 25.86%; H, 5.42; P, 16.61. Found: C, 25.65%; H, 5.36%; P, 16.55%.

A mixture of 2.0 g. (0.0054 mole) of zinc diethyl phosphate, 3.6 g. (0.045 mole) of titanium dioxide and 7.5 g. of dimethyl acetamide was ground together in a ball mill overnight. Application to a Type 304 stainless steel panel was made using a calibrated spreading knife. The coating was dried at room temperature for several hours, and dried overnight at 90° C. It was then cured in air according to the following schedule: 140° C., 4 hrs.; 200° C., 4 hrs. The cured coating was 0.5–1.0 mils thick, moderately hard (HB graphite pencil hardness), white, well-bonded, and having a good appearance.

Example 2

This example shows the preparation of a coating in which the zinc-to-phosphorus atomic ratio is 1:1.

A mixture of 1.26 g. (0.0034 mole) of zinc diethyl phosphate, 0.63 g. (0.0034 mole) of zinc acetate, 5.01 g. (0.0625 mole) of titanium dioxide and 5.0 g. of dimethyl acetamide was ground together in a ball mill overnight. Application to a Type 304 stainless steel panel was made as described in Example 1, finally curing at 538° C. The cured coating was 0.7–1.0 mil thick, moderately hard (HB graphite pencil hardness), white, well-bonded, and having a good appearance. Analysis of the coating by X-ray diffraction revealed only a weak indication of zinc orthophosphate, together with titanium dioxide (rutile).

An attempt was made to prepare a coating from a zinc phosphate and titanium dioxide, in which the zinc to phosphorus ratio was 1:1, as follows. A mixture of 0.58 g. (0.0016 mole) of zinc pyrophosphate trihydrate, 1.50 g. (0.019 mole) of titanium dioxide, and 3.0 g. of xylene was ground together into a suspension. It was applied to a stainless steel panel, air-dried at room temperature for several hours, dried at 245° C. for 1 hour and cured in nitrogen at 345° C. for 1 hour. The final cured coating was loosely adherent and easily rubbed off.

Example 3

This example shows the preparation of a coating in which the zinc-to-phosphorus atomic ratio is 1.5:1.

A mixture of 1.0 g. (0.0027 mole) of zinc diethyl phosphate, 0.99 g. (0.005 mole) of zinc acetate, 4.5 g. (0.056 mole) of titanium dioxide and 7.5 g. of dimethyl acetamide was ground together in a ball mill overnight. Application to the Type 304 stainless steel panel was made as described in Example 1, finally curing at 538° C. The cured coating was 0.3–0.8 mil thick, moderately hard (1 H graphite pencil hardness), light grey and having a somewhat mottled appearance.

Example 4

This example shows the preparation of a coating from zinc dibutyl phosphate.

There was first prepared zinc dibutyl phosphate. To a solution prepared from 2.1 g. (0.01 mole) of dibutyl phosphoric acid in 6 ml. of water and neutralized with $NH_4OH$ to a pH of 7, was added a solution of 1.1 g. (0.005 mole) of zinc acetate dihydrate in 6 ml. water. An oily layer formed which gradually hardened to a waxy solid, 1.5 g. (62% yield). It analyzed as follows:

Analysis.—Calcd. for $C_{16}H_{36}O_8P_2Zn$: C, 39.72%; H, 7.50; P, 12.80%; Zn 13.51. Found: C, 39.53%; H, 7.28%; P, 12.89%; Zn, 13.35%.

A mixture of 1.0 g. (0.0021 mole) of zinc dibutyl phosphate, 0.17 g. (0.0021 mole) of zinc oxide, 1.45 g. (0.018 mole) of titanium dioxide, and 4.0 g. xylene was ground together in a ball mill overnight. Application to a Type 304 stainless steel panel was made as described in Example 1, finally curing at 538° C. The final, cured coating was 0.6–0.7 mil thick, white and hard (9 H graphite pencil hardness).

Example 5

This example shows the preparation of a coating in which the zinc-to-phosphorus atomic ratio is 0.5:1.

There was first prepared zinc bis(2-ethylhexyl) phosphate. To a stirred solution of 6.6 g. (0.030 mole) of zinc acetate dihydrate in 240 ml. of methanol was added slowly a solution of 21.1 g. (0.066 mole) of bis(2-ethylhexyl) phosphoric acid in 100 ml. of methanol. After further stirring for 0.5 hour the precipitate was recovered by filtration and washed with methanol. The vacuum-dried solid (19.2 g., 90% yield) softened at 232–246° C. and resolidified about 290° C. It was soluble in xylene, forming a very viscous solution in 10% concentration. It analyzed as follows:

Analysis.—Calcd. for $C_{32}H_{68}O_8P_2Zn$: C, 54.27%; H, 9.68%; P, 8.75%; Zn, 9.23%. Found: C, 54.20%; H, 9.88%; P, 8.78%; Zn, 9.24%.

A mixture of 0.5 g. (0.0007 mole) of zinc bis(2-ethylhexyl) phosphate, 1.13 g. (0.014 mole) of titanium dioxide and 4.5 g. of xylene was ground together in a ball mill overnight. A Type 304 stainless steel panel was given a single coating with this material using the procedure of Example 1, finally curing at 200° C. The cured coating was 0.8–1.0 mil thick, moderately hard (1 H graphite pencil hardness), white, and with a somewhat roughened surface.

Example 6

This example shows the preparation of a coating in which the zinc-to-phosphorus atomic ratio is 1:0.67.

A mixture of 0.5 g. (0.0007 mole) of zinc bis(2-ethylhexyl) phosphate, 1.17 g. of a 41% solution (0.0014 mole) of zinc octoate, 0.81 g. (0.010 mole) of titanium dioxide and 4.5 g. of xylene was ground together in a ball mill overnight. A Type 304 stainless steel panel was given a single coating with this material using the procedure of Example 1, finally curing at 538° C. The cured coating was 0.3–0.4 mil thick, moderately hard (1 H graphite pencil hardness) and flat glossy, light grey in color.

Example 7

This example shows the preparation of a coating in which the zinc-to-phosphorus atomic ratio is 1:1.

A mixture of 0.3 g. (0.0004 mole) of zinc bis(2-ethylhexyl) phosphate, 0.035 g. (0.0004 mole) of zinc oxide, 0.64 g. (0.008 mole), of titanium dioxide and 5.7 g. of xylene was ground together in a ball mill overnight. It was applied to a Type 304 stainless steel panel as described in Example 1. There was no weight loss after the 200° C. cure. The cured coating was 0.1–0.2 mil thick, very hard (greater than H graphite pencil hardness), and flat glossy, white. Adherence to the steel panel was excellent, even after the panel was bent around a 0.5 inch mandrel.

When two coats were applied, with drying at 90° C. between coats, before curing, the final cured coating was 0.4–1.0 mil thick, and appeared otherwise the same as the thinner coating. When this coated panel was immersed in boiling water for two hours it was recovered substantially unchanged.

Example 8

This example shows the preparation of a coating in which the zinc-to-phosphorus atomic ratio is 1:1.

A mixture of 0.3 g. (0.0004 mole) of zinc bis(2-ethylhexyl) phosphate, 0.37 g. of a 41% solution (0.0004 mole) of zinc octoate, 0.63 g. (0.008 mole) of titanium dioxide and 5.7 g. of xylene was ground together in a ball mill overnight. Application to a Type 304 stainless steel panel was made as described in Example 1, finally curing at 538° C. The cured coating was 0.1–0.2 mil thick, very hard (6 H graphite pencil hardness), white, well-bonded and having good integrity. Examination by X-ray diffraction showed the presence of rutile and a low concentration of $\alpha$-$Zn_3(PO_4)_2$, together with amorphous material.

Example 9

This example shows the preparation of a coating from zinc bis(2-ethylhexyl) phosphate wherein the concentration of phosphate is increased by addition of butanol.

A mixture of 1.0 g. (0.0014 mole) of zinc bis(2-ethylhexyl) phosphate, 0.12 g. (0.0015 mole) of zinc oxide, 1.32 g. (0.0165 mole) of titanium dioxide in 4.0 g. xylene containing 3 drops of n-butanol was ground together in a ball mill overnight. Application to a Type 304 stainless steel panel was made as described in Example 1, finally curing at 200° C. The final, cured coating was 1.4–1.5 mils thick, moderately hard (1 H graphite pencil hardness), white, well-bonded, with good appearance.

Example 10

This example shows the preparation of a coating starting with bis(2-ethylhexyl) phosphoric acid.

A mixture of 3.22 g. (0.01 mole) of bis(2-ethylhexyl) phosphoric acid, 0.81 g. (0.01 mole) of zinc oxide, 4.59 g. (0.057 mole) of titanium dioxide and 4.0 g. of xylene was ground together in a ball mill for 5 hours. It was diluted with additional 4.0 g. of xylene and applied to a Type 304 stainless steel panel as in Example 1, finally curing at 200° C. The cured coating was 0.4–0.9 mil thick, very hard (9 H graphite pencil hardness), white, well-bonded, and having a good appearance.

Example 11

This example shows the preparation of a coating from the zinc salts of mixed (mono- and bis-) 2-ethylhexyl phosphoric acids. There were first prepared the zinc salts of the mixed mono(2-ethylhexyl) and bis(2-ethylhexyl) phosphoric acids. To 3.29 g. (0.015 mole) of zinc acetate dihydrate in 120 ml. of methanol was added a solution of 5.3 g. of an equimolar mixture of mono(2-ethylhexyl) and bis(2-ethylhexyl) phosphoric acids in 60 ml. of methanol. The solids which formed on standing for a few days were filtered off, washed with methanol, and dried under vacuum. The product melted at 220° C. and resolidified at about 260° C. It analyzed as follows:

*Analysis.*—Calcd. for $C_{24}H_{51}O_8P_2Zn_{1.5}$: C, 45.95%; H, 8.19%; P, 9.87%; Zn, 15.62%. Found: C, 45.82%; H, 8.25%; P, 10.16%; Zn, 15.45%.

A mixture of 0.5 g. (equivalent to 0.0016 mole of phosphorus) of the zinc salts of the mixed 2-ethylhexyl and bis(2-ethylhexyl) phosphoric acids, 0.032 g. (0.00026 mole) of zinc oxide, 1.15 g. (0.0145 mole) of titanium dioxide and 6.1 g. of xylene was ground together in a ball mill overnight. A Type 304 stainless steel panel was given a single coating with this material using the procedure of Example 1, finally curing at 200° C. The cured coating was white and adherent.

Example 12

This example shows the preparation of a coating from zinc tetramethylphosphorodiamidate.

There was first prepared barium tetramethylphosphorodiamidate by the reaction of tetramethylphosphorodiamidic chloride with barium hydroxide. To a slurry of 15.8 (0.05 mole) of barium hydroxide octahydrate in 20 ml. water was added 8.5 g. (0.05 mole of tetramethylphosphorodiamidic chloride, $[(CH_3)_2N]_2POCl$. After a half hour's stirring, the mixture was concentrated under vacuum, thereby crystallizing out by-product barium chloride. Further concentration yielded the desired barium salt, which corresponded to $\{[(CH_3)_2N]_2PO_2\}_2Ba \cdot 7H_2O$ by analysis.

Zinc tetramethylphosphorodiamidate, $$\{[(CH_3)_2N]_2PO_2\}_2Zn$$

was made by mixing aqueous solutions of equimolar quantities of the barium salt and zinc sulfate, removing the by-product barium sulfate by filtration, concentrating the filtrate and hereafter adding acetone to precipitate the product as needles. The product analyzed as follows:

*Analysis.*—Calcd. for $C_8H_{24}N_4O_4P_2Zn$: C, 26.14%; H, 6.58%; P, 16.85%. Found: C, 26.05%; H, 6.48%; P, 16.61%.

A mixture of 0.37 g. (0.001 mole) of zinc tetramethylphosphorodiamidate, 0.21 g. (0.0026 mole) of zinc oxide, 2.4 g. (0.03 mole) of titanium dioxide, and 6.0 g. of xylene is ground together in a ball mill overnight. A stainless steel panel is coated as described in Example 1, finally curing at 425° C. The cured coating is white and of good appearance.

Example 13

This example shows the preparation of a coating from zinc dimethylphosphinate.

There was first prepared zinc dimethylphosphinate. To a solution of 1.88 g. (0.02 mole) of dimethylphosphinic acid in 25 ml. of water was added 0.81 g. (0.01 mole) of zinc oxide. The mixture was stirred 5 minutes and the solids were removed by filtration. The filtrate was warmed to precipitate the product. It analyzed as follows:

*Analysis.*—Calcd. for $C_4H_{12}O_4P_2Zn$: C, 19.10%; H, 4.81%; P, 24.63%. Found: C, 19.26%; H, 4.97%; P, 24.49%.

A mixture of 0.5 g. (0.002 mole) of zinc dimethylphosphinate, 0.23 g. (0.0028 mole) of zinc oxide, 6.5 g. (0.082 mole) of titanium dioxide, and 7.9 g. of xylene is ground together in a ball mill overnight. A stainless steel panel is coated as described in Example 1, finally curing at 500° C. The cured coating is light grey, adherent and hard.

Example 14

This example shows the preparation of a coating from the zinc derivative of ethyl phosphate.

There was first prepared a zinc derivative of ethyl phosphonate. A mixture of 13.8 g. (0.1 mole) of ethyl phosphonate, $(C_2H_5O)_2P(O)H$, 4.05 g. (0.05 mole) of zinc oxide, 3 ml. water and 6 drops of 85% phosphoric acid was stirred at about 60–80° C. until the zinc oxide was dissolved and a nearly clear solution resulted. The water and volatile products were removed under vacuum, leaving the product as a viscous opalescent syrup. It was soluble in ethyl phosphonate or 1-methyl-2-pyrrolidinone.

A mixture of 0.6 g. of the syrupy zinc derivative of ethyl phosphonate, 1.6 g. of titanium dioxide and 1.2 g. of 1-methyl-2-pyrrolidinone was applied to a stainless steel panel. The solvent was removed by heating up to 245° C. and the remaining deposit was baked at 345° C. in a nitrogen atmosphere. The cured coating was 1.0–1.5 mil thick, very hard (9 H graphite pencil hardness), white, well-bonded and having a good appearance.

Example 15

This example shows the preparation of a coating from ethyl phosphonate.

A mixture of 1.52 g. (0.011 mole) of ethyl phosphonate, 1.32 g. (0.0163 mole) of zinc oxide, 10.5 g. (0.13 mole) of titanium dioxide, and 10 g. of 1-methyl-2-pyrrolidinone is ground together in a ball mill overnight. A stainless steel panel is coated as described in Example 1, finally curing at 345° C. The cured coating is white, hard, and of good appearance.

Example 16

This example shows a molding composition.

A mixture of 3.7 g. (0.01 mole) of zinc diethyl phosphate in about 50 ml. of warm benzene was stirred until the solids dissolved, forming a viscous solution. The benzene was boiled off to a volume of about 20 ml., and there was then added 0.8 g. (0.01 mole) of zinc oxide and 9.0 g. (0.11 mole) of titanium dioxide. The mixture was stirred to yield a smooth, white paste. Removal of the benzene with a vacuum and slight heating left a white solid, easily crushed to a finely powdered molding composition.

A molded object was prepared by compacting a portion of this composition in a steel die under 20,000 p.s.i.

When the compact was heated at 345° C. for 45 minutes there was obtained a dense, hard object having fine detail.

Example 17

This example shows formation of composites.

A three-ply glass laminate was laid up from three layers of glass cloth. Between each layer of cloth was placed a layer of the powdered molding composition of Example 16, consisting of zinc diethyl phosphate, zinc oxide and titanium dioxide. There was used 1.5 parts by weight of the composition for every 1.0 part of the glass cloth. The laminate was pressed at 750 p.s.i. at a temperature of 350° C. for about 40 minutes. The cooled laminate was firm and well-bonded.

Instead of making a composite with glass cloth, glass fibers may be used with the powdered molding composition of Example 16, and the whole pressed at about 750 p.s.i. and 350° C. until a well-bonded composite is formed. Similarly, inorganic fibers of boron, silica, silicon carbide, boron carbide, magnesium oxide, boron nitride, alumina, iron, zirconia, and silicon nitride may be substituted for the glass fibers in preparing strong composites having high heat-resistance.

It is to be understood that although the invention has been described with specific reference to particular embodiments thereof, it is not to be so limited since changes and alterations therein may be made which are within the full intended scope of this invention as defined by the appended claims.

What is claimed is:

1. A method of preparing a heat-resistant coating which comprises: (a) applying to the surface of a substrate a substantially uniform layer of a fluid composition comprising a mixture of (1) a zinc salt of a phosphorus compound having a formula selected from the class consisting of

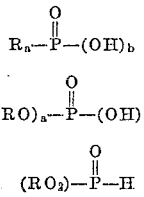

and

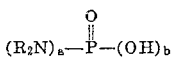

in which R is alkyl containing from 1 to 18 carbon atoms, and $a$ and $b$ are integers of from 1 to 2, and $a+b=3$, (2) a zinc compound selected from the class consisting of the oxide, the salts of inorganic and organic acids, and the alcoholates of zinc in quantity to provide a total zinc-to-phosphorus atomic ratio in the mixture of between 0.5:1.0 and 2.0:1.0, (3) finely comminuted titanium dioxide in quantity to provide a titanium-to-phosphorus atomic ratio in the mixture of between 0.5:1.0 and 21.0:1.0, and (4) an inert, organic, volatilizable liquid diluent; (b) volatilizing said diluent from said fluid composition to leave a residue on said surface; and (c) heating said residue at a temperature of between 130° C. and 550° C. until the components which decompose at this temperature have decomposed to obtain upon the substrate a strongly adherent in situ formed heat-resistant coating.

2. The method defined in claim 1, further limited in that the phosphorus compound is

3. The method defined in claim 1, further limited in that the phosphorus compound is dimethylphosphinic acid.

4. The method defined in claim 1, further limited in that the phosphorus compound is diethyl phosphoric acid.

5. The method defined in claim 1, further limited in that the phosphorus compound is dibutyl phosphoric acid.

6. The method defined in claim 1, further limited in that the phosphorus compound is dioctyl phosphoric acid.

7. The method defined in claim 1, further limited in that the phosphorus compound is diethyl phosphonate.

8. The method defined in claim 1, further limited in that the phosphorus compound is tetramethylphosphorodiamidic acid.

9. The method defined in claim 1, further limited in that the zinc compound is zinc oxide.

10. The method defined in claim 1, further limited in that the substrate is a solid heavy metal.

11. A method of preparing a heat-resistant composition by baking at between 130° C. and 550° C. a mixture of (1) a zinc salt of a phosphorus compound selected from the class consisting of

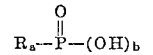

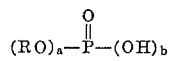

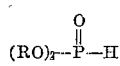

and

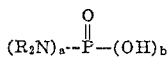

in which R is alkyl containing from 1 to 18 carbon atoms, and $a$ and $b$ are integers of from 1 to 2, and $a+b=3$, (2) a zinc compound selected from the class consisting of the oxide, the salts of inorganic and organic acids, and the alcoholates of zinc in quantity to provide a total zinc-to-phosphorus atomic ratio in the mixture of between 0.5:1.0 and 2.0:1.0, and (3) finely comminuted titanium dioxide in quantity to provide a titanium-to-phosphorus atomic ratio in the mixture of between 0.5:1.0 and 21.0:1.0.

12. In combination with a substrate a heat-resistant coating comprising compounds consisting of the elements zinc, phosphorus, titanium and oxygen having in the coating a total zinc-to-phosphorus atomic ratio of between 0.5:1.0 and 2.0:1.0 and a titanium-to-phosphorus atomic ratio of between 0.5:1.0 and 21.0:1.0.

13. A heat-resistant composition comprising compounds consisting of the elements zinc, phosphorus, titanium and oxygen having in the composition a total zinc-to-phosphorus atomic ratio of between 0.5:1.0 and 2.0:1.0 and a titanium-to-phosphorus atomic ratio of between 0.5:1.0 and 21.0:1.0.

14. A heat-resistant composite comprising a mixture of inorganic fibers selected from the class consisting of glass, boron, silica, silicon carbide, boron carbide, magnesium oxide, boron nitride, alumina, iron, zirconia and silicon nitride bonded in intimate contact with a bonding quantity of the composition of claim 13.

References Cited

UNITED STATES PATENTS

| 3,090,709 | 5/1963 | Henricks | 117—127 X |
| 3,196,056 | 7/1965 | Ornitz | 117—127 X |
| 3,313,650 | 4/1967 | Raeuber et al. | 117—127 |

OTHER REFERENCES

Michael A. Streicher, Metal Finishing, 61–68 (August 1948).

WILLIAM D. MARTIN, Primary Examiner

H. J. GWINNELL, Assistant Examiner

U.S. Cl. X.R.

106—15, 55; 117—123, 126, 137, 169

PO-1050
(5/69)

UNITED STATES PATENT OFFICE
CERTIFICATE OF CORRECTION

Patent No. 3,455,731      Dated July 15, 1969

Inventor(s) Morris L. Nielsen, Clayton E. Hathaway, Jr. & John M. Butler

It is certified that error appears in the above-identified patent and that said Letters Patent are hereby corrected as shown below:

Column 9, claim 1, line 45, "$(RO_2)$" should be --- $(RO)_2$ ---.

Signed and sealed this 2nd day of January 1973.

(SEAL)
Attest:

EDWARD M. FLETCHER, JR.
Attesting Officer

ROBERT GOTTSCHALK
Commissioner of Patent